(12) United States Patent  
Baumbach (10) Patent No.: US 11,756,228 B2
(45) Date of Patent: *Sep. 12, 2023

(54) SYSTEMS AND METHODS TO FACILITATE INTERACTION BY ONE OR MORE PARTICIPANTS WITH CONTENT PRESENTED ACROSS MULTIPLE DISTINCT PHYSICAL LOCATIONS

(71) Applicant: Disney Enterprises, Inc., Burbank, CA (US)

(72) Inventor: Elliott Baumbach, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/370,150

(22) Filed: Jul. 8, 2021

(65) Prior Publication Data

US 2021/0335003 A1 Oct. 28, 2021

Related U.S. Application Data

(63) Continuation of application No. 16/430,089, filed on Jun. 3, 2019, now Pat. No. 11,087,489.

(51) Int. Cl.
*G06K 9/00* (2022.01)
*G06T 7/73* (2017.01)
*H04N 21/442* (2011.01)
*G06V 20/00* (2022.01)
*G06T 7/292* (2017.01)
*G06T 7/70* (2017.01)

(52) U.S. Cl.
CPC ............... *G06T 7/73* (2017.01); *G06T 7/292* (2017.01); *G06T 7/70* (2017.01); *G06V 20/36* (2022.01); *H04N 21/44218* (2013.01); *G06T 2207/10016* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,030,764 B2 | 4/2006 | Smith | |
| 7,796,190 B2 * | 9/2010 | Basso | H04W 4/029 84/600 |
| 8,043,156 B2 | 10/2011 | Ackley | |
| 8,221,220 B2 | 7/2012 | Ackley | |

(Continued)

OTHER PUBLICATIONS

Kbrber et al., "Pervasive audio playback in cyber-physical environments," 2017 Intelligent Systems Conference (IntelliSys), 2017, pp. 531-541, doi: 10.1109/IntelliSys.2017.8324346. (Year: 2017).*

*Primary Examiner* — Feng Niu
(74) *Attorney, Agent, or Firm* — ESPLIN & ASSOCIATES, PC (57) ABSTRACT

This disclosure presents systems and methods to facilitate interaction by one or more participants with content presented across multiple distinct physical locations. A current distinct physical location of a participant may be determined. In response to determining the current distinct physical location in which the participant is located, operation of one or more content devices physically present in the current distinct physical location may be effectuated.

18 Claims, 3 Drawing Sheets

(56) References Cited

U.S. PATENT DOCUMENTS

| | | | |
|---|---|---|---|
| 8,411,126 B2 | 4/2013 | Lee | |
| 8,570,376 B1 | 10/2013 | Sharma | |
| 8,597,142 B2* | 12/2013 | Mayles | A63F 13/213 |
| | | | 473/226 |
| 8,622,823 B2 | 1/2014 | Huynh | |
| 8,779,266 B2* | 7/2014 | Basso | H04W 4/02 |
| | | | 84/602 |
| 9,041,734 B2* | 5/2015 | Look | G06T 15/20 |
| | | | 382/160 |
| 9,066,125 B2* | 6/2015 | Sands | H04N 21/42201 |
| 9,094,615 B2 | 7/2015 | Aman | |
| 9,356,983 B2* | 5/2016 | Basso | H04W 4/029 |
| 9,389,682 B2* | 7/2016 | Nakayama | G06F 3/04815 |
| 9,412,222 B2 | 8/2016 | Traphagen | |
| 9,510,319 B2* | 11/2016 | Ramakrishnan | H04W 64/006 |
| 9,883,142 B1 | 1/2018 | Sun | |
| 9,892,311 B2 | 2/2018 | Kusens | |
| 9,936,163 B1 | 4/2018 | Lubelsky | |
| 10,140,804 B2 | 11/2018 | Traphagen | |
| 10,210,378 B2 | 2/2019 | Kusens | |
| 10,282,720 B1* | 5/2019 | Buibas | G06V 20/52 |
| 10,410,042 B2 | 9/2019 | Kusens | |
| 10,459,676 B2 | 10/2019 | Knoppert et al. | |
| 10,484,818 B1* | 11/2019 | Ensing | H04W 4/02 |
| 10,493,298 B2 | 12/2019 | Hampton | |
| 10,643,061 B2 | 5/2020 | Kusens | |
| 10,643,079 B2* | 5/2020 | Li | G06Q 10/0833 |
| 10,748,190 B2 | 8/2020 | Kim | |
| 10,796,489 B1* | 10/2020 | Cordes | A63F 13/213 |
| 10,965,987 B2* | 3/2021 | Basso | H04L 65/60 |
| 11,048,326 B2* | 6/2021 | Ikeda | G06V 40/107 |
| 11,087,489 B2* | 8/2021 | Baumbach | G06V 40/103 |
| 11,209,903 B2* | 12/2021 | Leppanen | G06F 3/012 |
| 11,250,270 B1* | 2/2022 | Li | G08B 13/19645 |
| 2003/0058111 A1 | 3/2003 | Lee | |
| 2004/0046668 A1 | 3/2004 | Smith | |
| 2005/0122233 A1* | 6/2005 | Isoyama | H04Q 9/00 |
| | | | 340/870.11 |
| 2007/0198682 A1* | 8/2007 | Pazhyannur | H04L 65/1083 |
| | | | 709/223 |
| 2007/0279494 A1 | 12/2007 | Aman | |
| 2008/0084831 A1 | 4/2008 | Sylvain | |
| 2009/0006336 A1* | 1/2009 | Forstall | G06Q 30/00 |
| 2009/0051545 A1 | 2/2009 | Koblasz | |
| 2009/0328087 A1* | 12/2009 | Higgins | H04N 21/4524 |
| | | | 725/115 |
| 2010/0042235 A1* | 2/2010 | Basso | H04N 21/2389 |
| | | | 700/94 |
| 2010/0049397 A1* | 2/2010 | Liu | G01C 21/3469 |
| | | | 701/31.4 |
| 2010/0053164 A1* | 3/2010 | Imai | H04N 13/279 |
| | | | 345/1.3 |
| 2010/0315549 A1* | 12/2010 | Basso | H04N 21/4402 |
| | | | 348/E7.003 |
| 2011/0205068 A1 | 8/2011 | Huynh | |
| 2011/0316966 A1 | 12/2011 | Lee | |
| 2012/0146906 A1* | 6/2012 | Song | G06Q 30/02 |
| | | | 345/158 |
| 2013/0016102 A1* | 1/2013 | Look | G06V 40/19 |
| | | | 345/426 |
| 2013/0101159 A1 | 4/2013 | Chao | |
| 2013/0208103 A1* | 8/2013 | Sands | H04N 21/42201 |
| | | | 726/16 |
| 2014/0325033 A1* | 10/2014 | Basso | H04W 4/029 |
| | | | 709/219 |
| 2015/0035942 A1 | 2/2015 | Hampton | |
| 2015/0087413 A1 | 3/2015 | Traphagen | |
| 2016/0174185 A1* | 6/2016 | Ramakrishnan | H04W 64/006 |
| | | | 455/456.1 |
| 2016/0203524 A1 | 7/2016 | Kim | |
| 2016/0249100 A1* | 8/2016 | Basso | H04N 21/4516 |
| 2017/0193772 A1 | 7/2017 | Kusens | |
| 2018/0012463 A1 | 1/2018 | Chaudhry | |
| 2018/0040044 A1 | 2/2018 | Mattingly | |
| 2018/0098027 A1 | 4/2018 | Lubelsky | |
| 2018/0107440 A1 | 4/2018 | Knoppert et al. | |
| 2018/0107441 A1 | 4/2018 | Aurongzeb | |
| 2018/0285653 A1* | 10/2018 | Li | G08B 13/19645 |
| 2019/0282892 A1* | 9/2019 | Miyaki | A63F 13/497 |
| 2019/0384989 A1* | 12/2019 | Yamazaki | G06V 40/10 |
| 2020/0197807 A1* | 6/2020 | Tieger | A63F 13/86 |
| 2020/0202288 A1* | 6/2020 | Buibas | G06V 20/52 |
| 2020/0209951 A1* | 7/2020 | Ikeda | G06F 3/165 |
| 2020/0349348 A1* | 11/2020 | Zhou | |
| 2020/0380716 A1 | 12/2020 | Baumbach | |
| 2021/0157406 A1* | 5/2021 | Leppänen | G06F 3/011 |
| 2021/0168449 A1* | 6/2021 | Basso | H04L 65/60 |
| 2021/0318749 A1* | 10/2021 | Ikeda | G06F 3/0481 |
| 2022/0130149 A1* | 4/2022 | Li | G06V 10/40 |

* cited by examiner

SYSTEMS AND METHODS TO FACILITATE INTERACTION BY ONE OR MORE PARTICIPANTS WITH CONTENT PRESENTED ACROSS MULTIPLE DISTINCT PHYSICAL LOCATIONS

FIELD

This disclosure relates to systems and methods to facilitate interaction by one or more participants with content presented across multiple distinct physical locations.

BACKGROUND

Video calls and/or video games that incorporate a capture device, such as a video camera, may require the user to be in the same room as the device in order to participate in the video call and/or video game.

SUMMARY

One aspect of the disclosure relates to a system configured to facilitate interaction by one or more participants with content presented across multiple distinct physical locations. Content may be presented on, and/or generated from, content devices included in a set of content devices. A content device may include, for example, a video game console, a television, a camera, and/or other devices. Typically, during a video call and/or while playing a video game or watching television, a user may be confined to one location (e.g., a room) where a device is located. However, it is becoming more common that buildings (e.g., houses and/or offices) may be outfitted with multiple content devices with one or more of content devices being located in a given room. Further, some buildings may include multiple capture devices (e.g., cameras, microphones, and/or other devices) with one or more of capture device being located in a given room. As such, one or more implementations of the systems and methods presented herein make it possible for a participant to move between multiple distinct locations in a building while seamlessly maintaining their current interaction with content. For example, the capture devices may facilitate a determination of a participant's current location such that a content device located in the participant's current location may be utilized to present and/or generate content. An interaction by a participant with content may include one or more of the participant being depicted in the content (e.g., a video conference call), the participant controlling the content (e.g., playing a video game), the participant passively viewing the content (e.g., watching TV and/or a movie), and/or other interactions.

One or more implementations of a system configured to facilitate interaction by one or more participants with content presented across multiple distinct physical locations may include one or more of one or more servers, one or more computing platforms, one or more capture devices, one or more content devices, and/or other components. Individual capture devices may be physically located at, and/or associated with, individual distinct physical locations included in a set of distinct physical locations. Individual content devices may be physically located at, and/or associated with, the individual distinct physical locations included in the set of distinct physical locations.

The one or more servers may include one or more physical processors and/or other components. The one or more servers may communicate with one or more content devices, one or more capture devices, and/or one or more computing platforms via client/server architecture, and/or other communication schemes. The one or more physical processors may be configured by machine-readable instructions. Executing the machine-readable instructions may cause the one or more physical processor to facilitate interaction by one or more participants with content presented across multiple distinct physical locations. The machine-readable instructions may include one or more computer program components. The computer program components may include one or more of a detection component, a location component, a content component, and/or other components.

The detection component may be configured to obtain image information and/or other information. The image information may be derived from output signals generated by individual capture devices. The detection component may be configured to detect, based on the image information and/or other information, presence of one or more users within the individual distinct physical locations. The detection component may be configured identify, from the one or more users detected, a user as a participant of the system.

The location component may be configured to determine a current distinct physical location in which the participant may be located. The determination of the current distinct physical location may be based on one or more of the image information, the associations of the individual capture devices with the individual distinct physical locations, and/or other information.

The content component may be configured to, in response to determining the current distinct physical location in which the participant is located, effectuate operation of one or more content devices physically present in the current distinct physical location of the participant.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
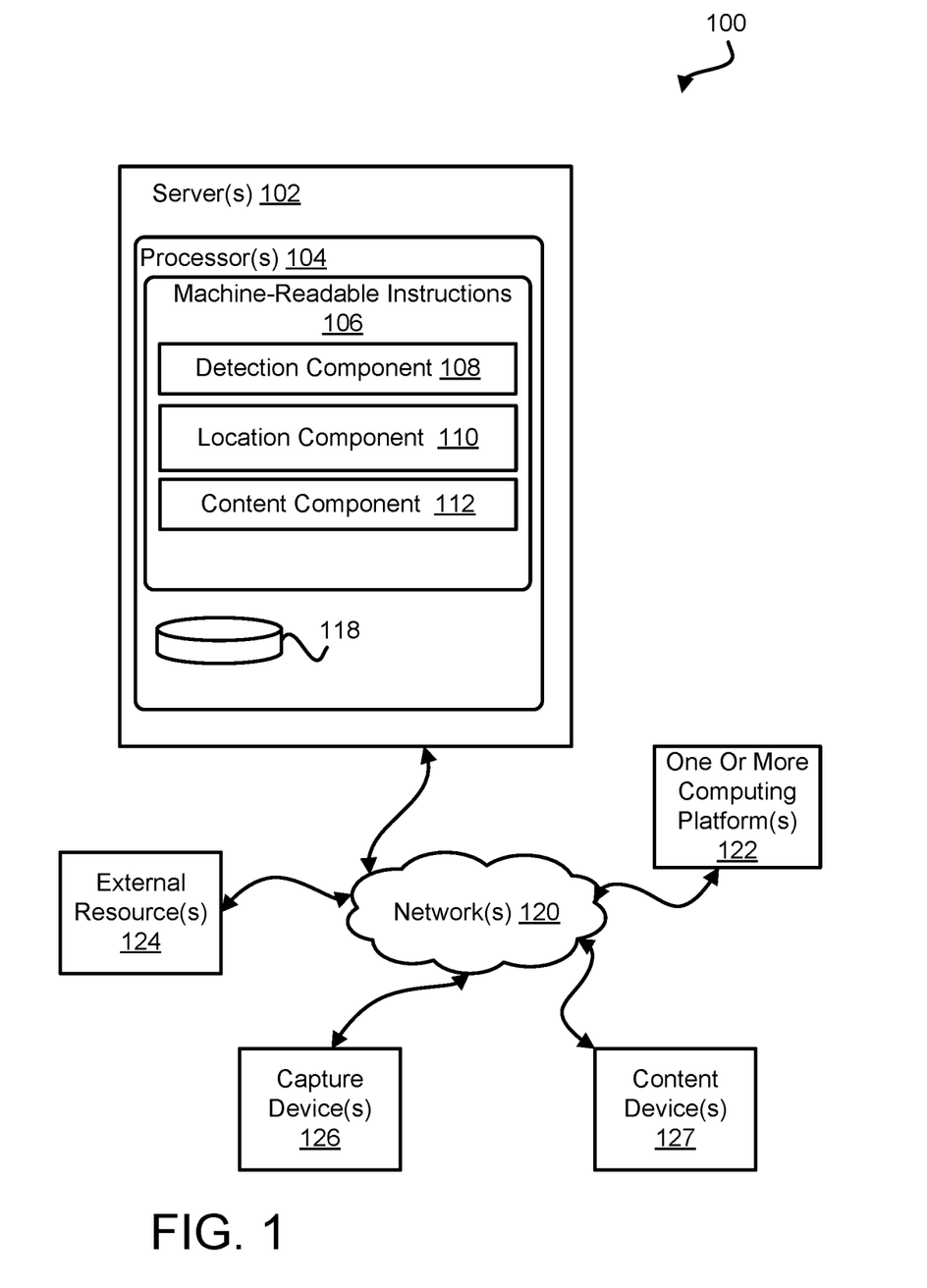
FIG. 1 illustrates a system configured to facilitate interaction by one or more participants with content presented across multiple distinct physical locations, in accordance with one or more implementations.

FIG. 1 illustrates a system 100 configured to facilitate interaction by one or more participants with content presented across multiple distinct physical locations, in accordance with one or more implementations. It is becoming more common that buildings (e.g., houses and/or offices) may be outfitted with multiple content devices with one or more of the content device being located in a given room. Further, some buildings may include multiple capture devices (e.g., cameras and/or microphones), where one or more of the capture device may be located in a given room. As such, one or more implementations of the systems and methods presented herein make it possible for one or more participants to move between multiple distinct locations while seamlessly maintaining their current interaction with content. For example, the capture devices may facilitate a determination of a participant's current location such that a content device located in the participant's current location may be utilized to present and/or generate content. An interaction by a participant with content may include one or more of the participant being depicted in the content (e.g., a video conference call), the participant controlling the content (e.g., playing a video game), the participant passively viewing the content (e.g., watching TV), and/or other interactions. It is noted that while some descriptions herein may be directed to a single participant, this is for illustrative purposes only and is not to be considered limiting. In some implementations, there may be multiple participants.

The system 100 may include one or more of one or more servers 102, one or more computing platforms 122, one or more capture devices 126, one or more content devices 127, and/or other components. The one or more servers 102 may include one or more of one or more physical processors 104, non-transitory electronic storage 118, and/or other components. The non-transitory electronic storage 118 may be configured to store information utilized by one or more servers 102, one or more computing platforms 122, one or more capture devices 126, one or more content devices 127, and/or other components of system 100.

In some implementations, one or more servers 102 may be configured to provide remote hosting of features and/or functions of machine-readable instructions 106 to individual computing platform of the one or more computing platforms 122. The one or more computing platforms 122 may be remotely located from one or more servers 102. The one or more servers 102 may communicate with one or more computing platforms 122 via client/server architecture, and/or other communication schemes. By way of non-limiting illustration, individual computing platforms of one or more computing platform 122 may download an application (e.g., non-transitory electronically stored information) configured to provide access to features and/or functions of machine-readable instructions 106. In some implementations, one or more features and/or functions of one or more servers 102 may be attributed as local features and/or functions of one or more computing platforms 122. For example, individual computing platforms of one or more computing platforms 122 may obtain and/or include machine-readable instructions that may be the same or similar to machine-readable instructions 106 of one or more physical processors 104. Individual computing platforms of one or more computing platforms 122 may include one or more of a mobile computing platform (e.g., one or more of a cellular telephone, a smartphone, a laptop, a tablet computer, a virtual reality (and/or augmented reality) platform, and/or other computing platforms), a stationary computing platform (e.g., a desktop computer), and/or other computing platforms. In some implementations, a virtual reality (and/or augmented reality) platform may include a virtual reality (and/or augmented reality) headset (e.g., goggles, glasses, and/or other headset), and/or other platform. By way of non-limiting illustration, a platform may be configured to present or provide views of an interactive space. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

Individual content devices of one or more content devices 127 may include devices configured to present and/or generate content. Content may include visual and/or audio content. An individual content device may include one or more of a cellular telephone, a smartphone, a laptop, a tablet computer, a virtual reality platform, a game console, a camera, a desktop computer, a mixed reality headset, augmented reality device, and/or other content device. In some implementations, an individual content device may include one or more of a display, one or more sensors, one or more audio output devices, and/or other components. A display may be configured to present visual content. The visual content may include one or more of individual images, image sequences, video, text, and/or other content. Presentation via a display of a content device may be facilitated by one or more processors of the content device and/or other components. By way of non-limiting example, presentation may be facilitated by a graphics processing unit (GPU) and/or other components. A display may include one or more of screen, a touchscreen, a monitor, a head-mounted display, a set of screens, and/or other displays. An audio output device may be configured to present audio content in the form of words, sounds, and/or other audio content. An audio output device may include, for example, a speaker.

An individual capture device of one or more capture devices 126 may be configured to generate output signals conveying information about a real-world environment surrounding the individual capture device. A capture device may include one or more sensors configured to generate output signals. The one or more sensors may in one or more of an image sensors, an audio sensor, and/or other sensors.

An image sensor may be configured to generate output signals conveying image information and/or other information. In some implementations, image information may define one or more of an image, an image sequence, a video, and/or other representations of the real-world space. An image may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

An audio sensor may generate output signals conveying audio information and/or other information. The audio information may define voice and/or sounds captured by the audio sensor. An audio sensor may include a microphone.

In some implementations, an individual capture device and an individual content device may comprise separate and distinct device or the individual capture device and the individual content device may comprise the same device. By way of non-limiting illustration, a content device may include a capture device (or components thereof), and/or vis versa. For example, a game console (or other content device) may include an image sensor (or other sensor of a capture device).

The one or more physical processors 104 may be configured by machine-readable instructions 106. Executing machine-readable instructions 106 may cause one or more physical processors 104 to facilitate interaction by one or more participants with content presented across multiple distinct physical locations. The machine-readable instructions 106 may include one or more computer program components. The one or more computer program components may include one or more of a detection component 108, a location component 110, a content component 112, and/or other components.

The detection component 108 may be configured to obtain image information and/or other information. The image information may be derived from output signals generated by individual capture devices included in the one or more capture devices 126. The individual capture devices may be physically located at, and/or associated with, individual distinct physical locations included in a set of distinct physical locations. The image information may define images depicting the individual distinct physical locations and/or real-world items and/or users therein. A given capture device may be associated with a given distinct physical location by virtue of the given capture device being located in the given distinct physical location.

The detection component 108 may be configured to detect, based on the image information and/or other information, presence of one or more users within the individual distinct physical locations. The detection component 108 may be configured identify, from the one or more users detected, a user as a participant of the system. Identifying may include determining the detected user is a participant in system 100. Identifying may include determining one or more of a name, a username, and/or other information unique to the participant. In some implementations, detection of presence and/or identification of a user as a participant based on image information may be accomplished through one or more image-processing techniques. By way of non-limiting illustration, techniques may include one or more of computer vision, Speeded Up Robust Features (SURF), Scale-invariant Feature Transform (SIFT), Oriented FAST and rotated BRIEF (ORB), facial recognition, and/or other techniques.

In some implementations, information used to identify participants based on image information may be stored in user accounts. By way of non-limiting illustration, information used to identify participants may include biometric information. The biometric information may include facial features and/or other identifying features. The user accounts may be stored in electronic storage 118 and/or other storage location. In some implementations, detection component 108 may access the user accounts to identify detected users as participants. In some implementations, different content may be associated with different content providers. The content provider may store the individual user accounts. The detection component 108 may access the user accounts via the content providers. By way of non-limiting illustration, content providers may comprise at least some of the external resource(s) 124.

In some implementations, detection component 108 may be configured distinguish between users as different participants in system 100. By way of non-limiting illustration, in the context of a multi-player video game, detection component 108 distinguish between a first player and a second player from multiple users whose presence has been detected.

The location component 110 may be configured to determine current distinct physical location(s) in which one or more participants may be located. The determination may be based on one or more of the image information, the associations of the individual capture devices with the individual distinct physical locations, and/or other information. By way of non-limiting illustration, based on output signals conveyed by a given capture device conveying image information used to identify a user as a participant, and based on knowing the distinct physical location in which the given capture device is located in, location component 110 may be configured to determine the current distinct physical location of a participant as the distinct physical location of the given capture device.

In some implementations, determining the current distinct physical location in which a given participant is located may be performed continuously and/or periodically.

The location component 110 may be configured to determine, based on the image information and/or other information, a trajectory of the participant. Trajectory of a participant may include a path of participant movement through a given physical location and/or set of physical locations. By way of non-limiting illustration, a trajectory may include a path from one side of a location to another side of the location. The trajectory may be determined through one or more image-based techniques.

The location component 110 may be configured to predict, based on the trajectory, a subsequent distinct physical location in which the participant may be located. By way of non-limiting illustration, location component 110 may be configured to learn, through machine-learning and/or other techniques, a physical layout of a set of distinct physical locations based on sequences of user detection from output signals of one capture device to another. By tracking movement, for example, using one or more image-based techniques, location component 110 may be configured to predict a subsequent distinct physical location in which the participant may be located within a threshold time following a determination of a current distinct physical location. The threshold time may include a time in the range of one or more of one to ten seconds, five to thirty seconds, thirty seconds to a minute, one to three minutes, and/or other threshold time.

The content component 112 may be configured to, in response to determining the current distinct physical location in which one or more participants are located, effectuate operation of one or more content devices physically present in the current distinct physical location of the participant(s). Effectuating operation may include sending control signals and/or other signals to the individual content devices to cause the individual content devices to present content (e.g., a video game) and/or generate content (e.g., a video call).

In some implementations, content component 112 may be configured to queue content based on a predicted subsequent location of a participant. By way of non-limiting illustration, content component 112 may be configured to queue content to be presented on a subsequent content device physically present in the subsequent distinct physical location in which the participant may be located. Queuing may include sending instructions to an individual content device to preload content for presentation. This may allow the subsequent content device to present content as soon as a participant is within the subsequent location (e.g., reduced latency due to queuing of content). In this manner, the participant may or may not experience the start of the operation of the content device as they enter the room and provide a seamless user experience.

In some implementations, content component 112 may be configured to effectuate presentation of content on the subsequent content device prior to detecting presence of the participant in the subsequent distinct physical location. In such implementations, a content device may present and/or generate content prior to the participant entering the location of the content device. In this manner, the participant may or may not experience the start of the operation of the content device as they enter the room and provide a seamless user experience.

In some implementations, effectuating operation of a content device may include effectuating presentation of content at the content device. Effectuating presentation of content at the content device may include transmitting control signals to the content device. The content may include game content, television content, movie content, and/or other content. In some implementations, the content presented at a content device may be specific to distinct physical location of the content device. The content specific to a distance physical location may be different from other content configured to be presented on other content devices present in other distinct physical locations. By way of non-limiting illustration, in the context of a video game, game content presented on a content device of a first location may be different than game content presented on a content device of a second location. In some implementations, the game content may be differentiated by virtue of representing different physical locations in the game. By way of non-limiting illustration, game content presented on the content device of a first location may depict a first game location and the game content presented on the content device of the second location may depict a second game location. By way of further illustration, the game content may include a mixed reality game taking place on a spaceship. Each different physical location may correspond to a different part of the spaceship. An individual physical location may have different gameplay aspects that might involve a different use of devices integrated into the system 100. For example, the first location may be designated as the cockpit and game controllers in the first location may be used to pilot the ship. The second location may be a communication room screen. The different devices in the individual locations may be operating in "sleep mode" until a user enters the location and then can be "awakened" when they enter or just before they enter. A user may immediately interact with the different content in the different locations during gameplay in a seamless manner.

In some implementations, effectuating operation of a content device may include obtaining information conveyed by output signals generated by the content device. By way of non-limiting illustration, the content device may include an image sensor configured to generate output signals conveying image information. The image information may facilitate an interaction such as a video call.

In some implementations, content component 112 may be configured to effectuate operation of multiple content devices concurrently. In some implementations, operation of multiple content devices effectuated concurrently may be based on multiple participants being identified and physically present in different locations. In some implementations, operation of multiple content devices effectuated concurrently may include presentation of the same content on individual content devices, different content on the individual content devices, and/or other presentation considerations. In some implementations, based on multiple participants being identified and physically present in different locations, content presented on one or more content devices may be modified to reflect the different users being in different locations. By way of non-limiting illustration, content presentation may change to split screen and/or other presentation mode.

The content component 112 may be configured to, in response to determining the current distinct physical location in which one or more participants are located, effectuate deactivation of one or more content devices physically present in a prior distinct physical location of the participant(s). Effectuating deactivation may include sending control signals and/or other signals to the individual content devices to cause the individual content devices to deactivate. In some implementations, deactivate may refer to one or more of turning off, entering sleep mode (or idle mode), pausing, and/or other considerations.

Figure 3:
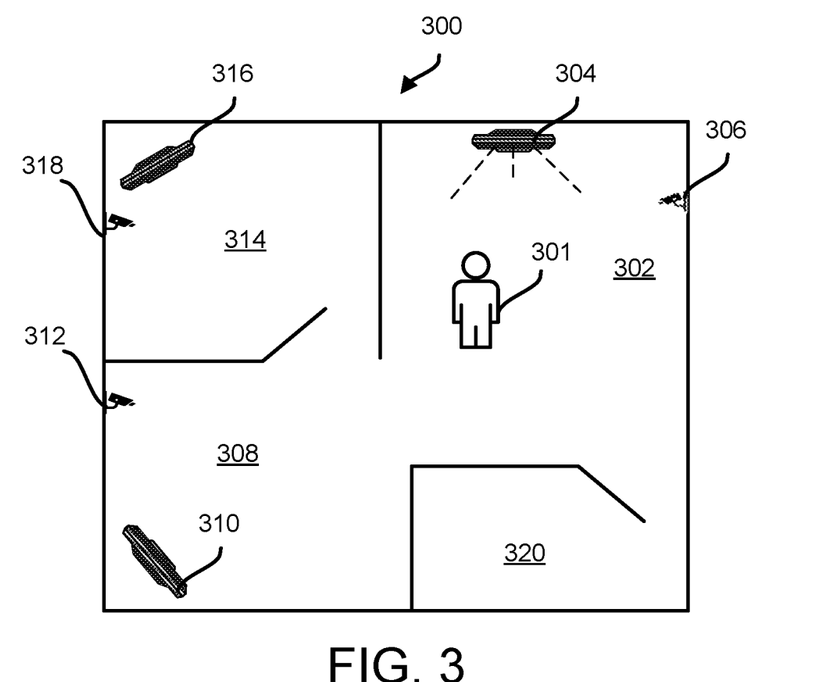
FIG. 3 illustrates an implementation of a system configured to facilitate interaction by one or more participants with content presented across multiple distinct physical locations.

FIG. 3 illustrates an implementation of a system configured to facilitate interaction by one or more participants with content presented across multiple distinct physical locations. The system may be implemented in a set of distinct physical locations 300, such as a building. The set of distinct physical locations 300 may include one or more of a first location 302, a second location 308, a third location 314, a fourth location 320, and/or other locations. The first location 302 may include one or more of a first content device 304, a first capture device 306, and/or other devices. The second location 308 may include one or more of a second content device 310, a second capture device 312, and/or other devices. The third location 314 may include one or more of a third content device 316, a third capture device 318, and/or other devices. In this example, the capture devices may comprise cameras and the content devices may comprise televisions and/or game consoles.

In FIG. 3, a user 301 may be located in a distinct physical location, such as the first location 302. The user 301 may be identified as a participant in the system. The first content device 304 may present content based on the user 301 being present in the first location 302. The user 301 may move to different locations in the set of distinct physical locations 300.

Figure 4:
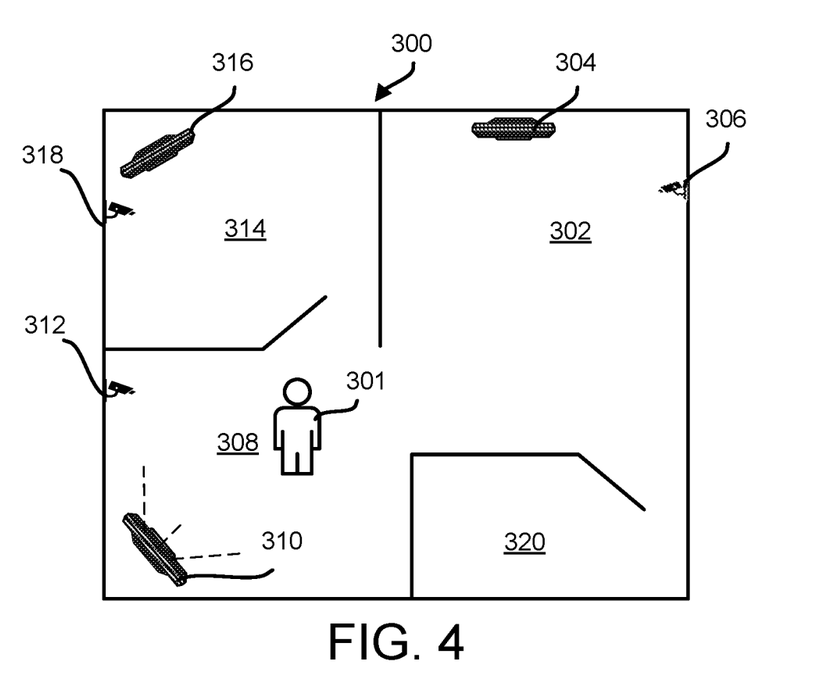
FIG. 4 illustrates an implementation of a system configured to facilitate interaction by one or more participants with content presented across multiple distinct physical locations.

FIG. 4 illustrates an implementation of the system configured to facilitate interaction by one or more participants with content presented across multiple distinct physical locations. The user 301 may have moved to the second location 308. The second capture device 312 may generate output signals conveying image information from which the presence and identity of user 301 may be determined. In response to determining the presence and identify of user 301 in the second location 308, the second content device 310 may be configured to present content.

Returning to FIG. 1, server(s) 102, one or more computing platforms 122, one or more capture devices 126, one or more content devices 127, external resource(s) 124, and/or other components may be operatively linked via one or more electronic communication links. For example, such electronic communication links may be established, at least in part, via one or more networks 120. One or more networks 120 may include the Internet, Bluetooth, and/or other networks. It will be appreciated that this is not intended to be limiting and that the scope of this disclosure includes implementations in which components of system 100 may be operatively linked via some other communication media.

External resource(s) 124 may include sources of information, hosts, and/or providers of information outside of system 100, external entities participating with system 100, and/or other resources. In some implementations, some or all of the functionality attributed herein to external resource(s) 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, and/or 112. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, 112, and/or other components. As another example, processor(s) 104 may be configured to execute one or more additional components that may perform some or all of the functionality attributed to one of components 108, 110, and/or 112.

Figure 2:
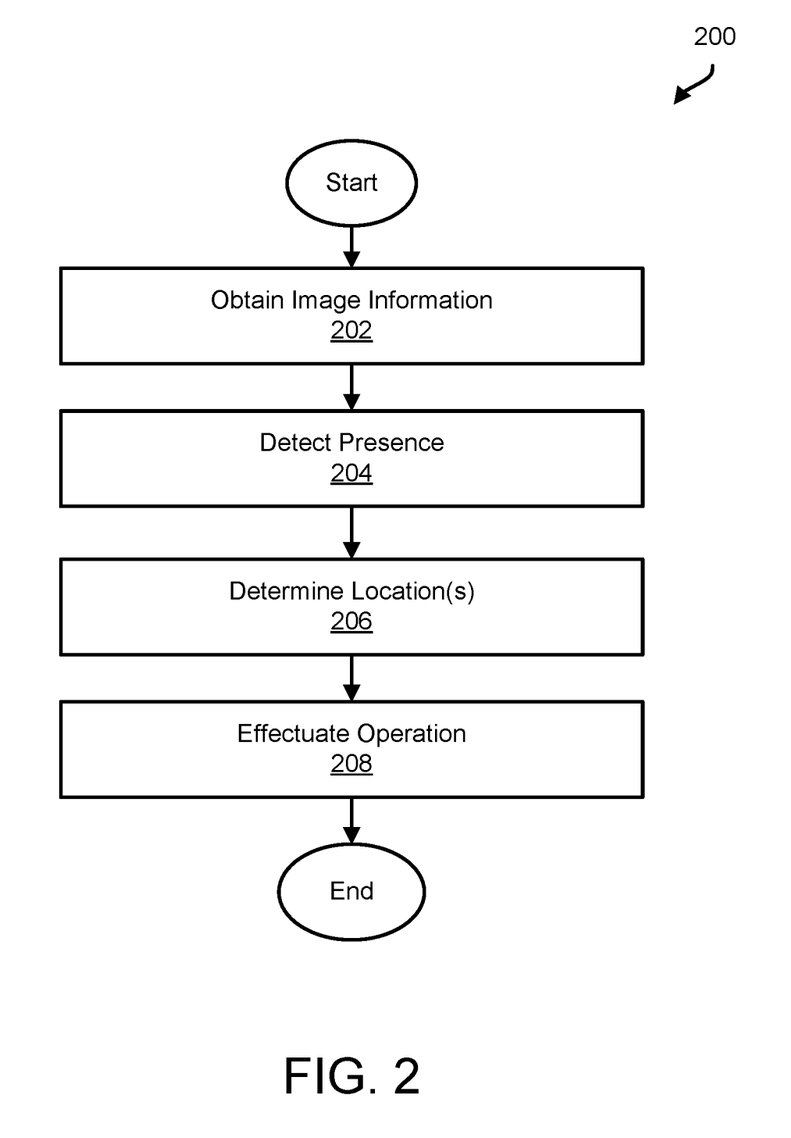
FIG. 2 illustrates a method to facilitate interaction by one or more participants with content presented across multiple distinct physical locations, in accordance with one or more implementations.

FIG. 2 illustrates a method 200 to facilitate interaction by one or more participants with content presented across multiple distinct physical locations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more capture devices, one or more content devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, image information may be obtained. The image information may be derived from output signals generated by individual capture devices included in a set of capture devices. The individual capture devices may be physically located at, and associated with, individual distinct physical locations included in a set of distinct physical locations. The image information may define images depicting the individual distinct physical locations. In some implementations, operation 202 may be performed by one or more physical processors executing a detection component the same as or similar to detection component 108 (shown in FIG. 1 and described herein).

At an operation 204, presence in the real-world environment of one or more users may be detected based on the image information and/or other information. A user may further be identified as a participant. In some implementations, operation 204 may be performed by one or more physical processors executing a detection component the same as or similar to detection component 108 (shown in FIG. 1 and described herein).

At an operation 206, a current distinct physical location in which the participant is located may be determined. The determination may be based on the image information and/or other information. In some implementations, operation 206 may be performed by one or more physical processors executing a location component the same as or similar to location component 110 (shown in FIG. 1 and described herein).

At an operation 208, in response to determining the current distinct physical location in which the participant is located, operation of a content device physically present in the current distinct physical location may be effectuated. The content device may be included in a set of content devices. Individual content devices in the set of content devices may be physically located at, and associated with, the individual distinct physical locations. In some implementations, operation 208 may be performed by one or more physical processors executing a content component the same as or similar to content component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present content seamlessly across multiple distinct physical locations, the system comprising:
one or more physical processors configured by machine-readable instructions to:
effectuate presentation of video game content on different content devices that are physically present in different physical locations based on presence of a user in individual ones of the different physical locations, the video game content being presented on an individual content device that corresponds to the user's physical presence in an individual physical location, and presented on other ones of the different content devices as the user's physical presence changes to other ones of the different physical locations to facilitate user interaction with the video game content on the different content devices while moving through the different physical locations, the video game content including different virtual locations in a game that correspond to the different physical locations and the different content devices at the different physical locations, such that a first virtual location in the game corresponds to a first content device in a first physical location, and a second virtual location in the game corresponds to a second content device in a second physical location, including:
in response to determining that the user is in the second physical location following the first physical location, effectuate operation of the second content device physically present in the second physical location, wherein the operation of the second content device includes effectuating presentation of the second virtual location in the game that corresponds to the second content device in the second physical location, such that a prior operation of the first content device in the first physical location included presentation of the first virtual location in the game that corresponds to the first physical location.

2. The system of claim 1, wherein effectuating operation of the second content device in the second physical location includes obtaining information conveyed by output signals generated by the second content device in the second physical location.

3. The system of claim 1, wherein the one or more physical processors are further configured by the machine-readable instructions to periodically determine whether the user's physical presence changes.

4. The system of claim 1, wherein the one or more physical processors are further configured by the machine-readable instructions to:
determine a trajectory of the user; and
predict a subsequent physical location in which the user may be located after the second physical location.

5. The system of claim 4, wherein the one or more physical processors are further configured by the machine-readable instructions to:
queue the video name content to be presented on a subsequent content device physically present in the subsequent physical location; and/or
effectuate presentation of the video game content on the subsequent content device prior to the user being in the subsequent physical location.

6. The system of claim 1, wherein the second content device includes a capture device.

7. The system of claim 1, wherein the different physical locations comprise different rooms of a building.

8. The system of claim 1, wherein the second content device includes one or more of a camera, a television, or a gaming console.

9. The system of claim 1, wherein the user interacting with the video game content includes one or both of controlling the video game content or passively viewing the video game content.

10. A method to present content seamlessly across multiple distinct physical locations, the method comprising:
effectuating presentation of video game content on different content devices that are physically present in different physical locations based on presence of a user in individual ones of the different physical locations, including presenting the video game content on an individual content device that corresponds to the user's physical presence in an individual physical location, and then presenting the video game content on other ones of the different content devices as the user's physical presence changes to other ones of the different physical locations to facilitate user interaction with the video game content on the different content devices while moving through the different physical locations, the video game content including different virtual locations in a game that correspond to the different physical locations and the different content devices at the different physical locations, such that a first virtual location in the game corresponds to a first content device in a first physical location, and a second virtual location in the game corresponds to a second content device in a second physical location, including:
in response to determining that the user is in the second physical location following the first physical location, effectuating operation of the second content device physically present in the second physical location, wherein the operation of the second content device includes effectuating presentation of the second virtual location in the game that corresponds to the second content device in the second physical location, such that a prior operation of the first content device in the first physical location included presentation of the first virtual location in the game that corresponds to the first physical location.

11. The method of claim 10, wherein the effectuating the operation of the second content device in the second physical location includes obtaining information conveyed by output signals generated by the second content device in the second physical location.

12. The method of claim 10, further comprising periodically determining whether the user's physical presence changes.

13. The method of claim 10, further comprising:
determining a trajectory of the user; and
predicting a subsequent physical location in which the user may be located after the second physical location.

14. The method of claim 13, further comprising:
queuing the video game content to be presented on a subsequent content device physically present in the subsequent physical location; and/or
effectuating presentation of the video game content on the subsequent content device prior to the user being in the subsequent physical location.

15. The method of claim 10, wherein the second content device includes a capture device.

16. The method of claim 10, wherein the different physical locations comprise different rooms of a building.

17. The method of claim 10, wherein the second content device includes one or more of a camera, a television, or a gaming console.

18. The method of claim 10, wherein the user interacting with the video game content includes one or both of controlling the video game content or passively viewing the video game content.

* * * * *

UNITED STATES PATENT AND TRADEMARK OFFICE
CERTIFICATE OF CORRECTION

PATENT NO. : 11,756,228 B2
APPLICATION NO. : 17/370150
DATED : September 12, 2023
INVENTOR(S) : Elliott Baumbach It is certified that error appears in the above-identified patent and that said Letters Patent is hereby corrected as shown below:

In the Claims

In Claim 5, Column 12, Line 22, please replace "name" with --game--, therefor.

Signed and Sealed this
Fourteenth Day of November, 2023

Katherine Kelly Vidal
*Director of the United States Patent and Trademark Office*